United States Patent [19]

May

[11] 4,247,095
[45] Jan. 27, 1981

[54] SHEET FEEDING AND REGISTRATION APPARATUS

[75] Inventor: Joseph N. May, Fairport, N.Y.

[73] Assignee: Xerox Corporation, Stamford, Conn.

[21] Appl. No.: 106,335

[22] Filed: Dec. 21, 1979

[51] Int. Cl.³ .......................... B65H 9/04; B65H 9/06
[52] U.S. Cl. .................................... 271/233; 271/236; 271/245
[58] Field of Search ............... 271/233, 245, 246, 247, 271/4, 243, 244, 226, 236, 237, 238, 275

[56] References Cited

U.S. PATENT DOCUMENTS

| | | | |
|---|---|---|---|
| 3,874,651 | 4/1975 | Sisson | 271/233 X |
| 3,910,570 | 10/1975 | Bleau | 271/245 |
| 4,043,550 | 8/1977 | Phillips et al. | 271/233 |
| 4,183,519 | 1/1980 | Harris | 271/245 |

OTHER PUBLICATIONS

Alderson, J. C., et al. *IBM Technical Disclosure Bulletin*, vol. 21, No. 6, Nov. 1978, pp. 2208–2209.

Alderson, J. C. et al. *IBM Technical Disclosure Bulletin*, vol. 21, No. 6, Nov. 1978, pp. 2222–2223.

*Primary Examiner*—Bruce H. Stoner, Jr.

[57] ABSTRACT

A sheet feeding and registering apparatus includes a document platen, a single wide document transport belt and a sheet registration member. The sheet registration member is a linear member with a plurality of lower registration edges at a first level above the platen and a plurality of sheet stripping portions raised to a level above the first level and forming therewith a series of undulations. The raised sheet stripping portions are inclined to a direction opposite the direction of sheet transport and with the document platen form a small sheet corner capturing cavity. When feeding a slightly skewed sheet to the registration edge the lead corner is first stripped from the transport belt, then physically captured by the cavity and pivoted about its lead edge until it is fully registered against the registration member.

11 Claims, 7 Drawing Figures

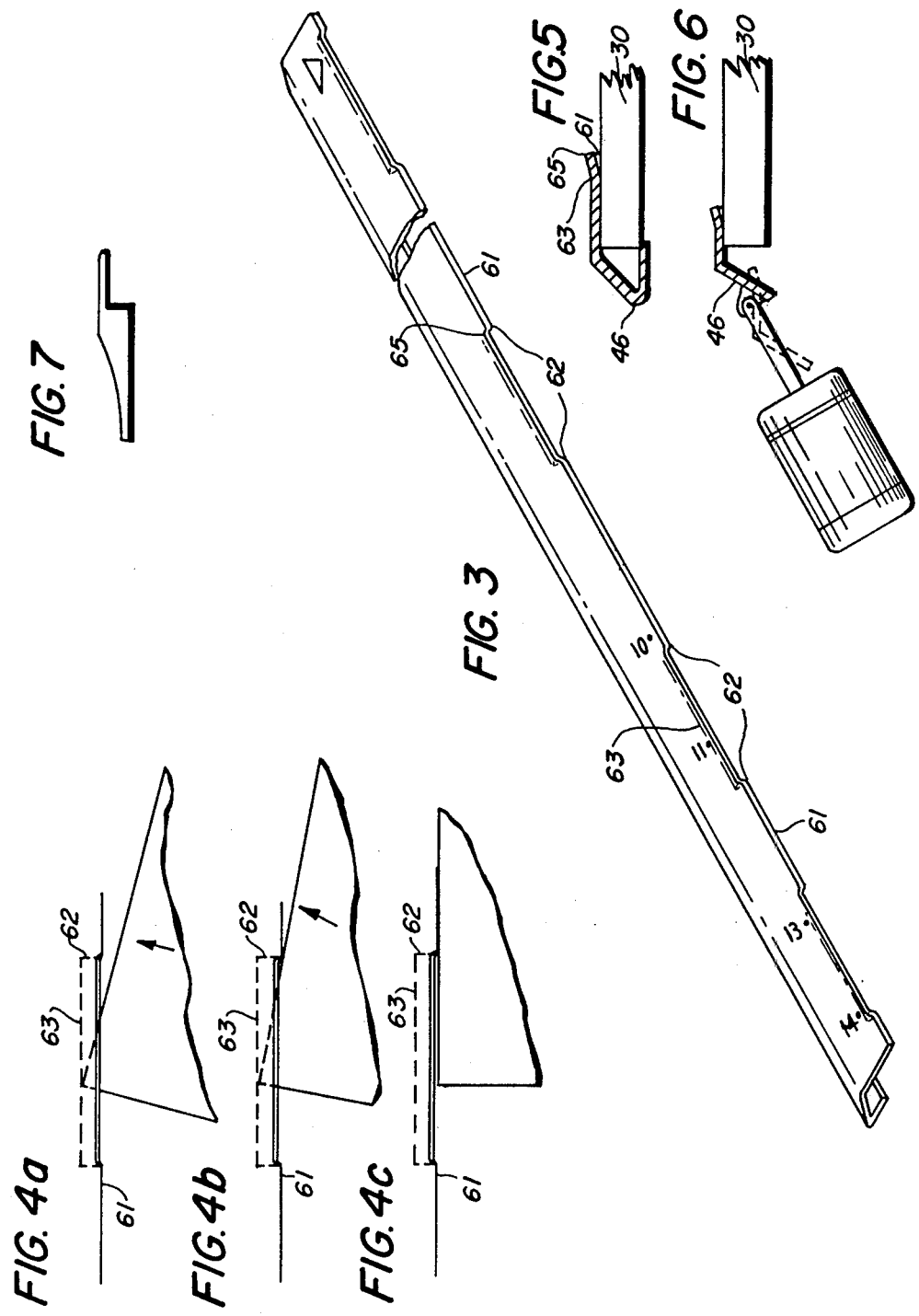

SHEET FEEDING AND REGISTRATION APPARATUS

BACKGROUND OF THE INVENTION

This invention relates to sheet feeding and registering apparatus and in particular to deskewing and registering a document to be copied in an automatic document copying machine.

This invention is particularly adapted for use with automatic copying machines where a document is automatically fed to a document copying platen, copied while it rests on copying platen and fed off the copying platen after the desired number of copies have been made.

With the continued development of xerographic reproduction apparatus including those capable of operating at higher speeds as well as those having multifunctional capability, it has become desirable to automatically process or handle a sheet or document that is to be copied. Many automatic copying devices in the past have relied on the operator manually aligning the document to be copied on the document copying platen and manually removing the document following copying.

More recently, devices have been developed to semi-automatically or automatically assist the operator in copying one or a sequence of documents. One of the more common and successful means for feeding a document to the copying platen for reproduction followed by movement away from the copying platen is a single large endless flexible transport belt arrangement. In this belt arrangement the belt drives the document into the copying position on the platen against some type of registration edge and then removes the document from the copying platen when the copy run has been completed.

Description of the Prior Art

The Xerox 3300 includes such a device wherein a single endless flexible belt drives a document over a fixed continuous registration edge onto the document copying platen, the belt direction is then reversed to register the document against the fixed continuous registration edge. Following copying of the desired number of copies of the document, the document belt is once again actuated in the forward direction to transport the document from the copying platen to a document collecting or storage site. The registration edge used is fixed to the edge of the platen glass and provides a single continuous lip or edge along the edge of the platen glass. Registering documents on the copying platen with this type of document handler is generally very satisfactory. However it occasionally happens with very light weight documents that when the document belt drives the document against the registration edge if the document is slightly skewed to one side and is not precisely parallel to the registration edge the corner of the document will contact the registration edge first, form a buckle and then skip or jump over the registration edge out of alignment for copying. When this happens copies are made of a misregistered document. It has been found that this difficulty occurs wit lightweight documents since they have reduced overall structural integrity, beam strength and stiffness and are therefore unable to resist the drive force driving the document over the registration edge.

U.S. Pat. No. 3,874,651 describes a registration edge for an automatic document handler which is similar to that used in the Xerox 9200. In this device a retractable continuous single level, angled machined or ground registration edge is used to strip the document from the belt and provide a self sharpening edge through the interaction of the edge with the belt. The sharp edged corner is from 79° to 84° to insure that the document is positively stripped across its entire dimension from the belt since at this angle the top corner of the registration edge is not rounded but rather is continuously sharpened. If it were rounded as with other angles the document would tend to be fed between the registration edge and document belt and be driven by the belt off of the platen. It is stated that if the angle of the registration edge is less than 79°, when documents strike it at a skewed angle, they may wrinkle or tear instead of straightening out.

U.S. Pat. No. 3,910,570 describes a similar document handler wherein a single document belt feeds documents toward a plurality retractable registration gate fingers in between which in the interior of the endless belt are a plurality of resiliently biased rollers which create bubbles in the belt to hold the document in contact with the platen so that the leading edge of the document abuts against the registration gate fingers and is stripped from the document belt. After copying the registration gate fingers are lowered and the document driven off the platen by the document belt.

The last two above described mechanisms are complex in that they both require registration gates movable into and out of registration position with the document and the platen. To accomplish this additional function activating and control mechanisms must be provided. Further, both devices are comparatively expensive requiring numerous additional mechanical components. In addition, the first described device requires that the resgistration edge be ground to a sharp edge.

In many of the prior art techniques problems are also encountered in the registering of light weight documents since if their leading edge is slightly skewed from being parallel to the registration edge or gate when the document contacts the gate it will have less resistance and stiffness to being first folded against the registration edge and the buckled forwarded over the registration edge. This happens because with light weight documents the structural integrity of the document is comparatively low and the document cannot resist the drive force over the registration edge.

SUMMARY OF THE INVENTION

In accordance with this invention, a novel sheet feeding and registering apparatus is provided. In particular an apparatus with an improved registration member is provided.

More particularly, the present invention is directed to sheet feeding and registering apparatus including a document platen, document transport belt and a sheet registration member comprising a lower registration edge at a first level above the platen and a plurality of stripping portions raised to a level above the first level and forming therewith a series of undulations, the raised stripping portions being inclined to a direction opposite the direction of sheet transport and forming with the document platen a small sheet capturing cavity.

The present invention provides a device for accurately registering documents of various paper weights including light weight documents. It has the particular advantage of being comparatively simple in its nature and operation and inexpensive in manufacture.

Accordingly it is an object of the present invention to provide a novel sheet feeding and registering apparatus.

It is a further object of the invention to provide a novel sheet deskewing apparatus.

It is a further object of the invention to provide a comparatively simple, inexpensive, easy to make and assemble sheet feeding and registering apparatus.

It is an additional object of the present invention to provide an improved document handling apparatus.

For a better understanding of the invention as well as other objects and further features thereof reference is had to the following drawings and description.

BRIEF DESCRIPTION OF THE DRAWINGS

FIG. 3 is an isometric view from the front of the registration edge of the present invention.

FIGS. 4a, 4b, 4c are top views depicting the deskewing action of the registration device of the present invention.

FIG. 5 is a side view of the registration edge fixed to the edge of a copying platen.

FIG. 6 is a side view of an alternative registration edge which is readily retractable from the edge of the copying platen.

FIG. 7 is a side view of an alternative configuration of the registration edge of the present invention.

DESCRIPTION OF PREFERRED EMBODIMENT

The invention will now be described by reference to a preferred embodiment of the sheet feeding and registering apparatus.

Figure 1:
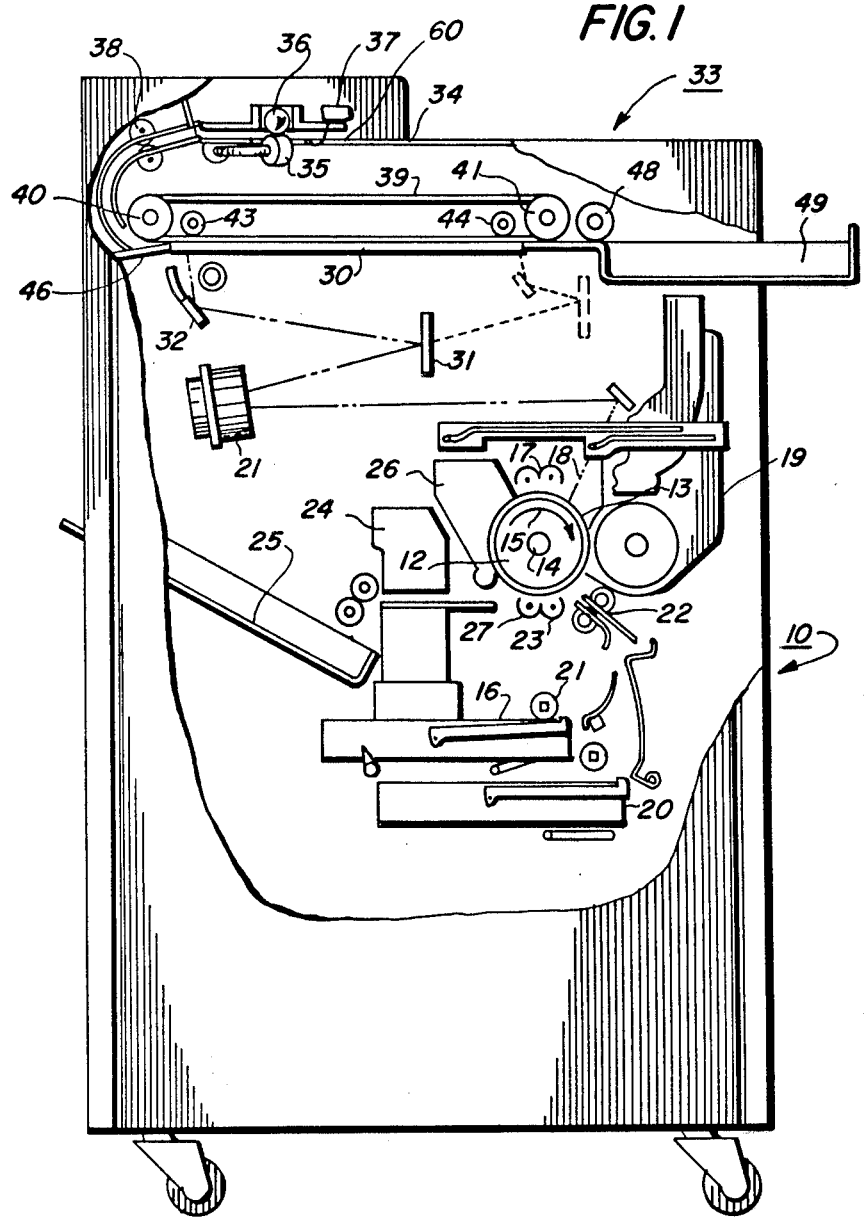
FIG. 1 is a schematic representation of an automatic zerographic reproducing apparatus employing the sheet feeding and registering apparatus of the present invention.

Referring now to FIG. 1, there is shown by way of example an automatic xerographic reproduction machine 10 which includes the sheet feeding and registering apparatus of the present invention. Although the apparatus of the present invention is particularly well adapted for use in an automatic xerographic reproducing machine 10, it should become evident from the following description that it is equally well suited for use in a wide variety of processing systems including other electrostatographic systems and it is not necessarily limited in the application to the particular embodiment or embodiments shown herein.

The reproducing machine 10, illustrated in FIG. 1 employs an image recording drum-like member 12, the outer periphery of which is coated with a suitable photoconductive material 13. The drum 12 rotates about shaft 14 in the direction indicated by arrow 15 to bring the image-bearing surface 13 thereon past a plurality of xerographic processing stations.

The drum 12 moves the photoconductive surface 13 through a charging station 17 where an electrostatic charge is placed uniformly over the photoconductive surface 13. Thereafter, the drum 12 is rotated to exposure station 18 wherein the charged photoconductive surface 13 is exposed to a light image of the original input scene information whereby the charge is selectively dissipated in the light exposed regions to record the original input scene in the form of an electrostatic latent image. After exposure, drum 12 rotates the electrostatic latent image recorded on the photoconductive surface 13 to development station 19 wherein a conventional developer mix is applied to the photoconductive surface 13 of the drum 12 rendering the latent image visible.

Sheets 16 of the final support material are supported in a stack arrangement on an elevating stack support tray 20. With the stack at its elevated position a sheet separator 21 feeds individual sheets therefrom to the registration system 22. The sheet is then forwarded to the transfer station 23 in proper registration with the image on the drum. The developed image on the photoconductive surface 13 is brought into contact with the sheet 16 of final support material within the transfer station 23 and the toner image is transferred from the photoconductive surface 13 to the contacting side of the final support sheet 16. Following transfer of the image the final support material which may be paper, plastic, etc., as desired, is transported through detack station where detack corotron 27 uniformily charges the support material to separate it from the drum.

After the toner image has been transferred to the sheet of final support material 16 the sheet with the image thereon is advanced to a fuser 24 which coalesces the transferred powder image thereto. After the fusing process the sheet 16 is advanced to a suitable output device such as tray 25. The residual toner particles remaining on the photoconductive surface 13 after the transfer operation are removed from the drum 12 as it moves through a cleaning station 26.

Normally, when the copier is operated in a conventional mode, the original document to be reproduced is placed image side down upon a horizontal transparent viewing platen 30 and the stationary original then scanned by means of a moving optical system. The scanning system fundamentally consists of a stationary lens system 21 positioned below the left hand margin of the platen as viewed in FIG. 1 and a pair of cooperating movable scanning mirrors 31, 32 which are carried upon carriages not illustrated.

Figure 2:
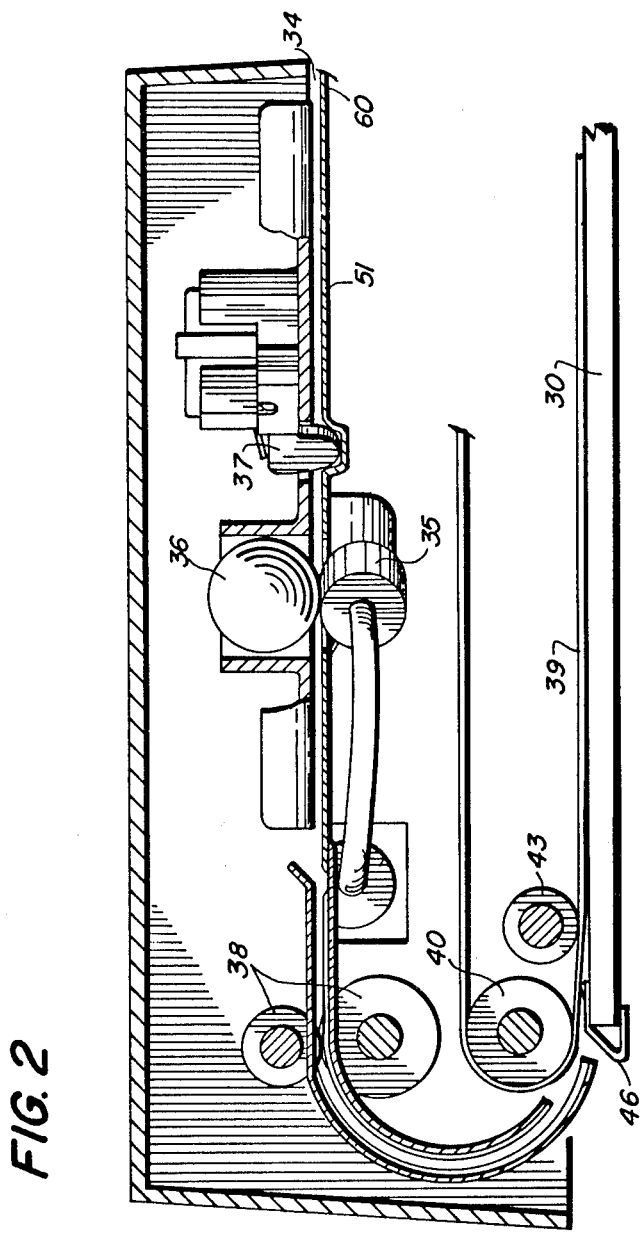
FIG. 2 is a side view of the document handler and platen with the sheet feeding registration apparatus of the present invention.

The document handler 33 which is shown in an enlarged side view in FIG. 2 includes as an input station, a sheet feed table 51, a copying sheet receiving slot 34, sheet alignment feed roll 35 and cooperating pinch device 36. When a sheet is inserted it makes switch 37 which activates sheet alignment roll 35 which feeds the sheet forward and aligns it against the rear or side registration 60 edge of the document handler. The pinch rolls 38 are activated when a switch is made to feed a document around the 180° curved guides onto the platen 30. The platen belt transport is comprised of a single wide belt 39 having one run over the platen 30. The belt 39 is wrapped about two pulleys 40 and 41 which are arranged such that the belt surface at the bottom of the pulley with the assistance of input backup roll 43 and output backup roll 44 is in light contact with the platen. The document is driven by the belt 39 across the platen until the trailing edge of the document has cleared registration edge 46 after which the platen belt transport is stopped and the direction in which the document is driven is reversed so that it is registered against registration edge 46 and is now ready for copying. Once in position, the scanning optical system is activated and the document is scanned by full rate mirror 32. At the end of scan the full rate mirror 32 and the half rate mirror 31 are in the positions shown in phantom in FIG. 1. After copying the platen belt transport is again activated and the document is driven off the platen by the output pinch roll 48 into the document catch tray 49.

The sheet registration member which forms an essential feature of the sheet feeding and registering apparatus of the present invention is shown in greater detail in FIG. 3 and 5 wherein the sheet registration member is shown to comprise a lower registration edge 61 directly on top of the platen 30. The contact of the lower registration edge with the platen glass is broken at points 62 which are connected by angled member 65 to the raised stripping registration edge 63. A plurality of stripping registration edges 63 alternates with a plurality of lower registration edges 61 along the entire registrating length of the registration member. This provides a two level registration edge. The second registration edge being at a level above the platen glass forms a cavity between the top of the edge 63 and the platen glass 30. While the registration member may be fabricated in any suitable way, it is typically stamped from a single flat piece of sheet metal. As seen in FIGS. 3 and 5, the stamping process serves to raise the stripping edge 63 above the two edges being connected by angled members 65 at broken points 62. This stamping operation provides a single piece registration member having two distinct registration edges as well as a partially enclosed cavity.

As will be made more clear by reference to FIGS. 4a, 4b and 4c this registration member provides a combined sheet stripping, deskewing and registering function. In operation, as a sheet is driven toward the registration member by document belt 30 pressure is maintained between the belt and the registration edge by input backup roll 43. As the sheet is fed toward the registration member, it remains tacked to the belt until it encounters the stripping or raised portions 63 of the registration edge which interrupts the path of travel and strips the sheet from the belt. Since the document belt is urged by the continuous input backup cylindrical roll 43 toward the registration member which has an uneven surface comprised by the two levels of the registration member, the document belt tends to be slightly corrugated between adjacent high and low registration edges. This belt corrugation formed by the compliance of the belt around the raised portions of the registration member enables the sheet to be fed into the raised stripping portions of the registration member which act like individual stripping fingers and thereby strip any sheet tacked to the corrugated belt.

Once the raised portions of the registration member strip the tacked sheet from the belt, if the sheet is skewed to any significant degree, the cavity defined by the platen glass and the raised portions of the registration member serves to deskew the sheet so that it may be fully registered along its entire dimension. This may be more vividly appreciated by reference to FIGS. 4a, 4b and 4c wherein the deskewing of a sheet is shown in exaggerated detail. In FIG. 4a a skewed sheet once having been stripped from the belt has a lead corner inserted in the above defined cavity which physically captures the corner of the sheet. It has been found that even with a very small cavity, the physical confinement of only a small corner of a sheet by the cavity is sufficient to inhibit the sheet from buckling and then springing or jumping over the registration edge. Once the lead corner of a skewed sheet is stripped from the belt, physically captured by the cavity, that portion of the sheet distant from the registration edge which has not been registered remains tacked to the belt and is driven forward toward the registration edge. As it is driven forward, the sheet begins to turn until the side of the sheet starts to pivot about broken point 62 as shown in FIG. 4b. The sheet continues to pivot about the broken point 62 as a result of the belt driving the sheet forward until the entire edge is aligned or registered against the lower registration edge as depicted in FIG. 4c.

This mechanism takes advantages of the fact that a side or an edge of a sheet has far greater structural integrity than a leading corner. As briefly described above, if a leading corner comes into contact with a stop member it tends to buckle and snap over the edge whereas a side edge greater structural integrity will first try to reorient itself about a pivot to accommodate all the forces acting on it without buckling. It is believed that there is a greater probability of deskewing if an edge rather than a corner of the sheet is the pivot point. Since the skewed sheet has its corner plus the distance to a pivot point 62 (See FIG. 4b) physically captured deskewing without having the sheet buckle and snap over the edge is even more successful. As stated above, the action is achieved even with relatively lightweight sheets such as 9 pound onion skin.

To ensure that a corner of a skewed document will be captured by the registration member cavity, the cavities are strategically positioned along the length of the registration members to accommodate traditional sheet sizes. Common sheet sizes are described in the table below.

| Common Standard Commercial Paper Sheet Sizes | | |
| --- | --- | --- |
| Size Description | Sizes in Inches | Sizes in Centimeters |
| 1. U.S. Government (old) | 8 × 10.5 | 20.3 × 26.7 |
| 2. U.S. Letter | 8.5 × 11 | 21.6 × 27.9 |
| 3. U.S. Legal | 8.5 × 13 | 21.6 × 33.0 |
| 4. U.S. Legal | 8.5 × 14 | 21.6 × 35.6 |
| 5. U.S. Engineering | 9 × 12 | 22.9 × 30.5 |
| 6. ISO* B5 | 6.93 × 9.84 | 17.6 × 25.0 |
| 7. ISO* A4 | 8.27 × 11.69 | 21.0 × 29.7 |
| 8. ISO* B4 | 9.84 × 13.9 | 25.0 × 35.3 |
| 9. Japanese B5 | 7.17 × 10.12 | 18.2 × 25.7 |
| 10. Japanese B4 | 10.12 × 14.33 | 25.7 × 36.4 |

*International Standards Organization

Thus if it were certain that only U.S. Letter and Legal size paper were going to be used all that would be necessary would be a registration member with three raised portions, one at the side, adjacent the side registration edge one around 11 inches and one encompassing 13 and 14 inches as shown in FIG. 3. The raised portions may be of any suitable length and typically are of the order of about 2 to 3 centimeters in length. As will be noted since all sheets are first registered against a side registration edge prior to being fed to the platen in the document handler described the positioning of the raised portions within rather narrow limits should be effective in capturing either corner of a sheet that may be skewed.

The raised portions of the registration member may be inclined at any suitable angle relative to the lower portions. Typically they are inclined at angles of from about 15 degrees to about 25 degrees. It is desirable only that the raised portions be located and oriented to facilitate sheets being transported over the registration member when used in a document handler which first feeds sheets over the registration edge onto the platen and secondly reverses the sheet feed direction to register the sheets against the registration edge. While the lower registration edge is in contact with the glass platen the raised portions may be at any suitable level above the first registration edge. Typically the lower registration edge is of the order of from about 0.25 millimeter to about 0.40 millimeter in thickness and the stripping edge is an equal distance above the lower registration edge. It is essential only that the cavity formed by the platen and the stripping edge be large enough to physically capture the corner of a sheet being registered.

The registration member may be mounted to the platen glass in a suitable manner such as by transfer tape, glue or spring clip fastener. While the described mode is the currently preferred mode of operating, it should be noted that the registration member may also be mounted to be selectively retractable from the stripping, deskewing and registering position as shown in FIG. 6 wherein solenoid 67 is used to control the position of the registration member from an operative to an inoperative position, shown in phantom.

As described above the registration member of the present invention comprises a plurality of lower registration edges with a plurality of raised stripping edges adjacent to each other, the stripping edges forming with the platen glass a sheet capturing cavity. In addition the undulations formed by the adjacent first registration edges and raised portions serve when acted upon by the input backup roll to corrugate the sheet transport belt thereby enabling a sheet being transported to be stripped from the belt. Typically the force exerted on the document transport belt by the input backup roll to insure the desired stripping is of the order of about 500 to 800 grams and may be readily provided merely by the weight of the roll itself. Also as described above any skewed sheet is more effectively deskewed by pivoting around an edge rather than a corner resulting in a very reliable registering device. The feeding and registering device is very simple, inexpensive to manufacture and provides a highly reliable feeding and registering member.

Figure 8:
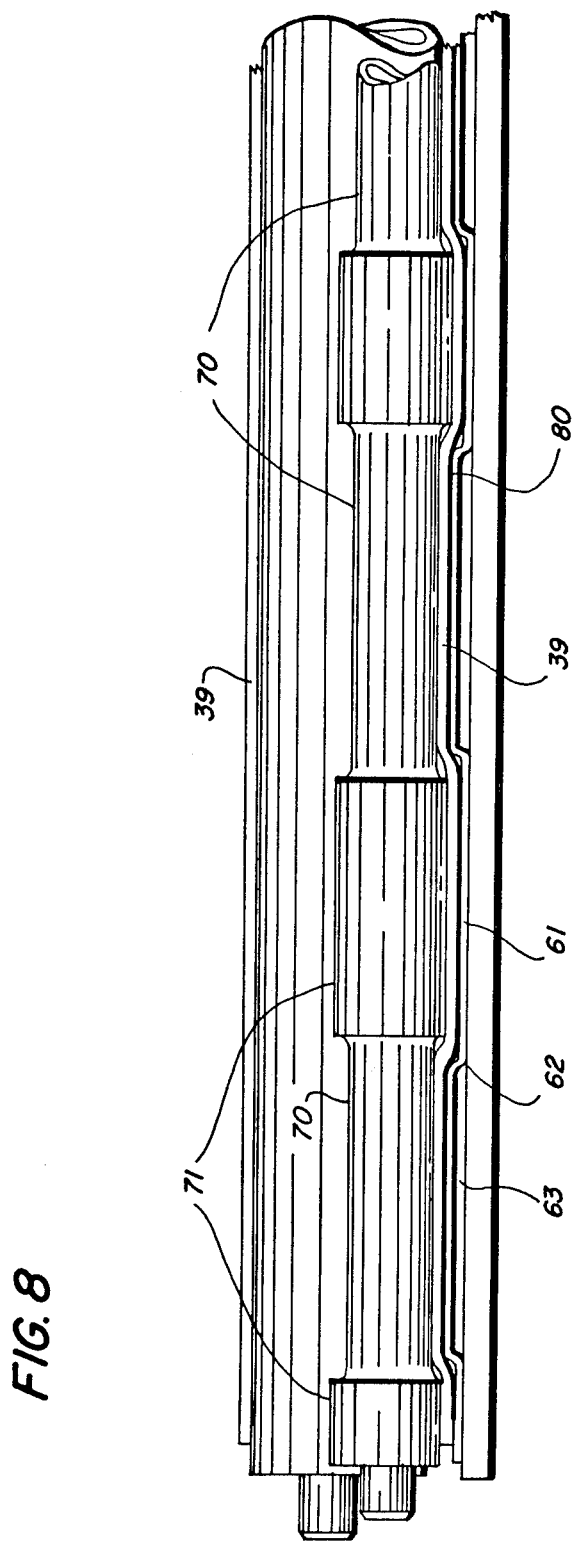
FIG. 8 is a representation of the registration edge together with an alternative cylindrical backup roll wherein the stripping action of the registration edge is accentuated.

While the input backup roll which puts the pressure on a transport belt to assist in stripping the sheet has been described as being a continuous cylindrical roll it should be understood that a solid cylindrical roll containing cylindrical portions of increased diameter which correspond to the lower portions of the registration edge and as were fully seen in FIG. 8 may be used. In this way the sheet being registered is advanced toward the registration edge and the larger diameter roll portions further corrugate the sheet between the lower portions and raised stripping portions and accentuates the stripping mechanisms. Thus as seen in FIG. 8 the input backup pressure roll has regular diameter portions 70 and increased diameter portions 71. The roll portions of increased diameter 71 are placed opposite the lower registration edge portions 61 thereby further corrugating the sheet 80 and accentuating the stripping action.

While the invention has been described with reference to a sheet feeding apparatus employing a fixed registration member over which a sheet is first fed, its direction reversed for registration followed by feeding off the platen, it should be understood that many alternatives, modifications and variations will be apparent to the artisan. The registration edge may be retractable, for example, as depicted in FIG. 6 and the registration with a sheet being fed toward the registration edge followed by lowering the edge and transporting the sheet off the platen. Alternatively, of course, the registration member could be fixed to the edge of a platen, a sheet transported into engagement with the registration member and subsequently transported back off the platen in a reverse direction. As a further modification that will be apparent to the artisan, the interior of registration member may form a square cut pattern between the first registration edge and the stripping edge as shown in FIG. 7.

It is intended to embrace all such alternatives and modifications as may fall within the spirit and scope of the appended claims.

I claim:

1. A sheet feeding and registering apparatus comprising a flat support surface across which a sheet may be fed, a single flexible sheet transport belt extending at least across said flat support surface for transporting a sheet from one side of said flat support surface to the opposite side of said flat support surface, a continuous sheet registration member adjacent said opposite side of said flat support surface, the improvement wherein said continuous sheet registration member comprises a plurality of spaced lower registration edge portions at a first level above the flat support surface and in the sheet transport path, and a plurality of spaced sheet stripping registration edge portions raised to a level spaced above said first level located in the space between said lower portions and forming therewith a series of undulations, said raised stripping portions being inclined opposite to the direction of sheet transport and each forming with the flat support surface, a sheet capturing cavity of sufficient dimensions that a corner of a sheet being registered adjacent said registration edge may be inserted within the cavity and captured therein from further forward movement.

2. The apparatus of claim 1 wherein said registration member is fixedly attached to said flat support surface.

3. The apparatus of claim 1 wherein said registration member is retractable from its registration position to a level below the flat support surface.

4. The apparatus of claim 1 wherein said flexible sheet transport belt is an endless belt supported and driven about rollers at opposite ends of said flat support surface and further including means to urge said belt into pressure contact with said plurality of raised stop portions whereby a sheet being transported by the belt may be stripped from the belt and its forward motion arrested.

5. The apparatus of claim 4 wherein said means to urge said belt into pressure contact with said raised portions comprises a continuous pressure roll.

6. The apparatus of claim 4 wherein said means to urge said belt into pressure contact with said raised portions comprises a pressure roll having cylindrical roll portions of increased diameter opposite the lower registration portions of the registration member.

7. The apparatus of claim 4 including means to drive said belt in a first direction whereby a sheet being transported by said belt is transported past said registration member onto said flat support surface, means to reverse the belt direction whereby a sheet being transported is driven into said registration member and stripped from the belt, and means to drive said belt in a first direction whereby a sheet on said flat support surface is driven in said first direction off of said flat support surface.

8. The apparatus of claim 1 wherein said flat support surface comprises the platen of a document copying machine.

9. The apparatus of claim 1 wherein each of said plurality of raised stripping portions is located along the registration edge at portions where the corners of traditional size sheets would first come in contact with the edge.

10. The apparatus of claim 1 wherein the portion of said raised stripping portion which joins said lower registration edge portions is rounded to a radius.

11. A document feeding and registering apparatus for a document copying machine comprising a document copying platen, a document registration member fixed to a first side of said platen, means to register a document along an edge parallel to the document transport path, means to transport a document across said platen from said first side over said registration member to a second side, means to reverse the direction of said document to register it against said registration member, means to drive said document in a forward direction following copying of said document, said document registration member comprising a plurality of spaced lower registration edge portions having a first registration stop level in the sheet transport path and above the platen, and a second registration level comprising a plurality of spaced stripping portions raised to a level spaced above said first level located in the space between said lower portions and forming therewith a series of undulations, said raised stripping portions being inclined is the direction of sheet transport and each forming with the document platen a sheet capturing cavity of sufficient dimensions that a corner of a sheet being registered against said registration edge may be inserted within the cavity and captured therein from further reverse movement.

* * * * *